US009528831B2

(12) United States Patent
Entringer et al.

(10) Patent No.: US 9,528,831 B2
(45) Date of Patent: Dec. 27, 2016

(54) ELECTRONIC CIRCUIT FOR MEASURING ROTATIONAL SPEED IN A MEMS GYROSCOPE AND METHOD FOR ACTUATING THE CIRCUIT

(71) Applicant: EM Microelectronic-Marin SA, Marin (CH)

(72) Inventors: Christophe Entringer, Corcelles-pres-Concise (CH); Alexandre Deschildre, Marin (CH); Sylvain Grosjean, Les Fins (FR)

(73) Assignee: EM Microelectronic-Marin SA, Marin (CH)

( * ) Notice: Subject to any disclaimer, the term of this patent is extended or adjusted under 35 U.S.C. 154(b) by 164 days.

(21) Appl. No.: 14/552,891

(22) Filed: Nov. 25, 2014

(65) Prior Publication Data

US 2015/0176992 A1 Jun. 25, 2015

(30) Foreign Application Priority Data

Dec. 19, 2013 (EP) .................................. 13198518

(51) Int. Cl.
*G01C 19/5776* (2012.01)
*G01C 19/567* (2012.01)

(52) U.S. Cl.
CPC .......... *G01C 19/567* (2013.01); *G01C 19/5776* (2013.01)

(58) Field of Classification Search
CPC ............ G01C 19/5712; G01C 19/5776; G01C 19/5614; G01C 19/5621; G01C 19/567; H03B 5/04; H03B 5/1215; H03B 5/124; H03B 5/30; H03B 5/366; G03B 5/1228

(Continued)

(56) References Cited

U.S. PATENT DOCUMENTS 6,564,637 B1 5/2003 Schalk et al.
9,194,703 B2 * 11/2015 Entringer ........... G01C 19/5712
(Continued)

FOREIGN PATENT DOCUMENTS

EP 2 211 143 A1 7/2010
EP 2 259 019 A1 12/2010
EP 2 336 717 A1 6/2011

OTHER PUBLICATIONS

European Search Report issued May 23, 2014 in European Application 13198518, filed on Dec. 19, 2013 ( with English Translation).

(Continued)

*Primary Examiner* — Helen Kwok
(74) *Attorney, Agent, or Firm* — Oblon, McClelland, Maier & Neustadt, L.L.P.

(57) ABSTRACT

The electronic circuit measures angular speed in a gyroscope, which includes a mass connected to a spring and a damping element, an actuation capacitor for actuating the mass and a detection capacitor for detecting motion of the mass. The electronic circuit includes a measurement resistor, which is connected to the moving mass and has a variation in resistive value equal to the oscillation frequency of the mass. The resistor is polarized to supply a measurement signal, which includes a carrier signal in phase with the oscillation of the mass and an angular speed signal phase shifted by $\pi/2$ relative to the carrier signal The measurement signal is supplied to an integration unit clocked by a clocking signal phase shifted by $\pi/2$ relative to the carrier signal and originating from the drive circuit. The angular speed signal is demodulated at the integration unit output.

24 Claims, 5 Drawing Sheets

(58) Field of Classification Search
USPC .......................................... 73/504.12, 504.02
See application file for complete search history.

(56) References Cited

U.S. PATENT DOCUMENTS

| | | | | |
|---|---|---|---|---|
| 2008/0197861 | A1* | 8/2008 | Grosjean | ............... G01D 18/00 |
| | | | | 324/661 |
| 2010/0186506 | A1 | 7/2010 | Robert | |
| 2010/0231237 | A1* | 9/2010 | Deschildre | ............ G01P 15/125 |
| | | | | 324/661 |
| 2011/0285445 | A1* | 11/2011 | Huang | ..................... H03B 5/30 |
| | | | | 327/306 |
| 2013/0055815 | A1 | 3/2013 | Yanagisawa et al. | |

OTHER PUBLICATIONS

Mikko Saukoski "System and Circuit Design for a Capacitive Mems Gryoscope", TKK Dissertations 116, Espoo 2008, 2008, 279 pages.
Xu Wang et al. "Force to Rebalance Control of HRG and Suppression of Its Errors on the Basis of FPGA", Sensors, ISSN 1424-8220, 2011, 13 pages.

\* cited by examiner

ELECTRONIC CIRCUIT FOR MEASURING ROTATIONAL SPEED IN A MEMS GYROSCOPE AND METHOD FOR ACTUATING THE CIRCUIT

This application claims priority from European Patent Application No. 13198518.6 filed on 19 Dec. 2013, the entire disclosure of which is hereby incorporated herein by reference.

FIELD OF THE INVENTION

The present invention concerns an electronic circuit for measuring rotational speed or angular speed in a MEMS gyroscope with a high quality factor.

The present invention also concerns the method of actuating the electronic circuit for measuring rotational speed.

BACKGROUND OF THE INVENTION

Conventionally, an electronic circuit connected to at least one resonator of a MEMS resonator device can also be used to perform an angular speed measurement. An angular speed may be measured along one, two or three axes, for example, with a MEMS gyroscope. The gyroscope generally includes at least one mass maintained by a structure in the form of a spring and capable of being set in oscillation electrically at a frequency determined by the spring constant with a defined damping factor for the mass. An angular speed can be determined based on the oscillation speed of the mass and the force generated, which is perpendicular to the angular speed and to the oscillation motion of the mass.

To achieve this, there exist electronic circuits enabling the mass to be driven in oscillation at a determined frequency and at a defined amplitude, and for measuring an angular speed in a perpendicular direction to the oscillation of the mass. These electronic drive circuits, which preferably use oscillation in a phase lock loop to drive oscillation along at least one axis of motion of the MEMS resonator as described, in particular, in EP Patent Applications Nos 2 259 019 A1 and 2 336 717 A1. A phase lock loop is used to maintain the oscillation of the resonator mass in a first direction. When a rotational speed is to be measured by a measurement circuit, an oscillation is also generated in a second direction perpendicular to the first direction with a phase shift of π/2 relative to the oscillation in the first direction. No reduction in power consumption can be obtained for maintaining oscillation of the mass and the rotational speed measurement, since a relatively high supply voltage is also required. The start time of such a rotational speed measurement system is therefore slow, which also constitutes a drawback.

Reference may also be made to the electronic circuit for driving and measuring the angular speed of at least one MEMS resonator of a gyroscope on one, two or three axes, which is disclosed in the thesis entitled "System and circuit design for a capacitive MEMS gyroscope" by Mikko Saukoski of Helsinki University of Technology, Faculty of Electronics, Communication and Automation, Department of Micro and Nano Sciences dated 2008 (ISBN9789512292974). As previously, a phase lock loop is used for maintaining the oscillation of the primary resonator mass of the gyroscope, as shown in FIG. 2.9 of page 31. The rotational speed measurement is determined by the secondary resonator of the gyroscope in a direction perpendicular to the motion of the oscillating mass. This does not make it possible to reduce the electrical power consumption of the system, which is a drawback. Several perturbations are also observed between the actuation of oscillation of the mass and the detection of motion of the mass for regulating the amplitude of oscillation without also facilitating the angular speed measurement, which constitutes another drawback.

The document entitled "Force to rebalance control of HRG and suppression of its errors on the basis of FPGA" by Xu Wang, Wenqi Wu, Bing Luo, Zhen Fang, Yun Li and Qingan Jiang, published on 16 Dec. 2011 in Sensors 2011 (ISSN 1424-8220), may also be cited. This document discloses a new concept of adapting force for a hemisphere gyroscopic resonator on the basis of an FPGA. The system disclosed provides for forced oscillation of the mass by a VCO oscillator on the basis of cos(ω·t) and sine(ω·t) signals. The system detects the motion of the secondary resonator, which is defined as the south electrode for powering the primary resonator, which is defined as the west electrode. This therefore cancels out vibration on the primary. In this control loop, phase and amplitude are controlled to supply exactly the power necessary to cancel out the motion of the secondary.

One drawback of this system is that it uses a VCO oscillator. This makes it impossible to reduce the overall electrical power consumption of the system for controlling the phase and amplitude of oscillation and also for the angular speed measurement. Further, the information from the secondary is used to oscillate the primary resonator. This complicates manufacture, and also the precision of the oscillation phase and amplitude control. The primary is dependent on the secondary, which is another drawback.

SUMMARY OF THE INVENTION

It is therefore an object of the invention to overcome the drawbacks of the aforementioned state of the art by providing an electronic circuit for measuring rotational speed in a MEMS gyroscope, which is not complex and can minimise electrical power consumption while easily determining angular speed by removing the influence of the signal for maintaining oscillation of the mass.

To this end, the invention concerns an electronic circuit for measuring rotational speed in a gyroscope with a MEMS resonator, the electronic circuit being connected to at least one resonator of the gyroscope, the resonator including a mass connected to a structure of the gyroscope by a spring and a damping element, an actuation element for setting in motion the mass in one direction based on an actuation signal, supplied by a drive circuit, and a detection element for detecting motion of the mass to adapt at least one level of oscillation amplitude of the moving mass in a control loop of the drive circuit, wherein the electronic circuit includes a measurement element in the form of at least one resistor, which is connected to the moving mass and whose resistive value varies at a frequency identical to the oscillation frequency of the moving mass, the resistor being polarized to supply at least one measurement signal at one of the ends thereof, the measurement signal being formed of a combination of a carrier signal in phase with the oscillation of the moving mass and of an angular speed signal phase shifted by π/2, and wherein the electronic circuit includes an integration unit clocked by a clocking signal originating from the control loop of the drive circuit, the clocking signal being phase shifted by π/2 relative to a detection signal of the detection element in phase with the carrier signal to allow the integration unit to demodulate the angular speed signal from the measurement signal.

Specific embodiments of the electronic circuit for measuring rotational speed in a MEMS gyroscope are defined in the dependent claims 2 to 18.

One advantage of the electronic circuit for measuring rotational speed lies in the fact, that following integration of a measurement signal dependent on the oscillation of the oscillating mass, it is easily possible to demodulate the angular speed signal. Demodulation is performed synchronously in an integration unit based on a clocking signal at an equivalent frequency to the oscillation frequency of the moving mass, and therefore on a carrier signal detected in a drive circuit. However, this clocking signal supplied by the drive circuit, is phase shifted by $\pi/2$ in the control loop of the resonator mass drive circuit relative to the carrier signal. This advantageously enables said angular speed signal to be demodulated from the measurement signal.

Advantageously, no phase lock loop is used to oscillate the mass and to measure rotational speed. This makes it possible to measure rotational speed based on maintenance of oscillation of the resonator mass at low power and with a high quality factor of the MEMS resonator.

Advantageously, only one signal, which includes angular speed data, can be converted or sampled by a straightforward analogue-digital converter. The electronic circuit for measuring angular speed can be implemented in the gyroscope in a simple manner compared to the state of the art circuit.

Advantageously, at least two successive integration phases may be provided in the integration unit in two successive half-periods of the clocking signal. In each half-period of integration, the angular speed signal is demodulated from the measurement signal. At the end of the two half-periods of the clocking signal, the integration signal includes the addition of the two integration areas of the angular speed signal.

To this end, the invention also concerns a method for actuating an electronic circuit for measuring rotational speed in a gyroscope with a MEMS resonator, wherein the method includes the steps of:

supplying a measurement signal via at least one measurement resistor dependent on the oscillation of the resonator mass to an integration unit in an integration phase dependent on the clocking signal, and supplying an integration signal relating to the angular speed signal demodulated from the measurement signal at the integration unit output for the duration of a half-period of a first state of the clocking signal.

Particular steps of the method are defined in the dependent claims 20 to 24.

BRIEF DESCRIPTION OF THE DRAWINGS

The objects, advantages and characteristics of the electronic circuit for measuring rotational speed in a MEMS gyroscope, and the method for actuating the electronic circuit will appear more clearly in the following description made on the basis of non-limiting embodiments, illustrated by the drawings, in which.

DETAILED DESCRIPTION OF THE INVENTION

In the following description, all those electronic components of the electronic circuit directly connected to the resonator of the gyroscope, which are well known to those skilled in the art in this technical field, will be described only in a simplified manner. Preferably, the gyroscope is a gyroscope with a MEMS sensor or resonator with a high quality factor. The basic functions of the electronic circuit are to measure rotational speed based on the maintenance of oscillation of the primary resonator mass. This mass oscillates in a determined direction with suitable amplitude of mechanical oscillation of the mass.

Figure 1:
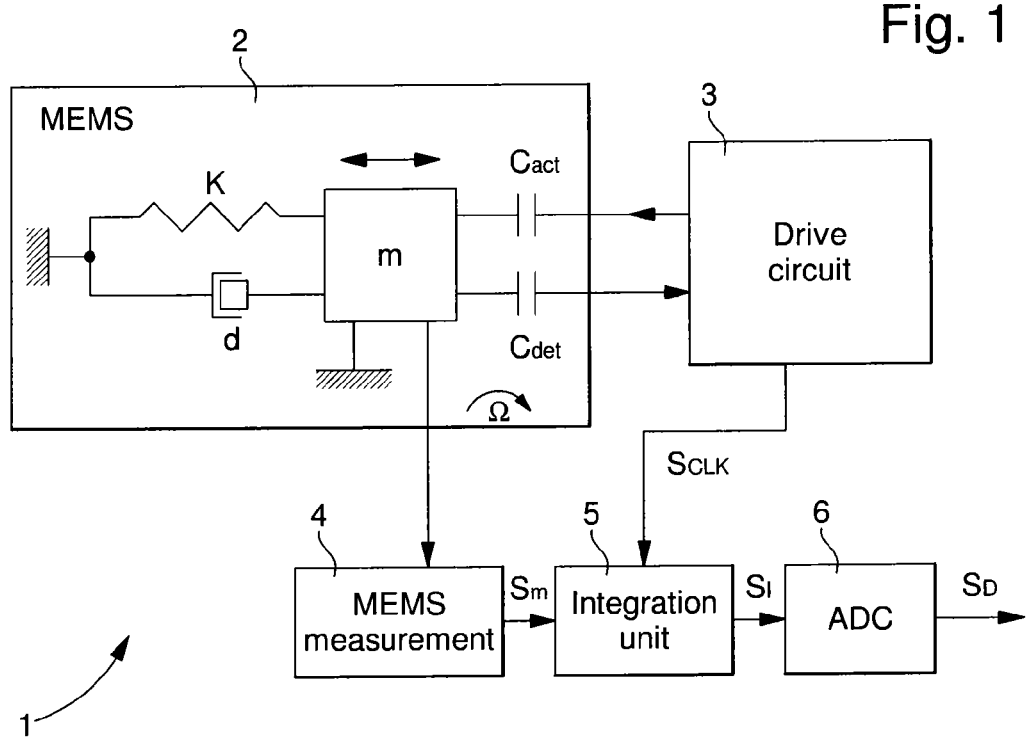
FIG. 1 shows a simplified view of the components of the electronic circuit for measuring rotational speed in a MEMS resonator gyroscope according to the invention.

FIG. 1 shows an embodiment of the electronic circuit for measuring rotational speed or angular speed in a MEMS resonator gyroscope. The electronic circuit includes a drive circuit 3 connected to a MEMS resonator 2. This drive circuit 3 makes it possible, on the one hand, for resonator 2 to be actuated via an actuation element $C_{act}$ and on the other hand, for the motion of a mass m of resonator 2 to be detected via a detection element $C_{det}$. Actuation element $C_{act}$ and detection element $C_{det}$ may generally be considered to form part of the components of resonator 2, but they may also be considered to form part of drive circuit 3 of resonator 2. The amplitude of oscillation of mass m is adapted in a control loop of drive circuit 3 as a function of the measurement or detection of motion of mass m, as explained hereafter with reference to FIG. 6.

It is to be noted that the actuation element is preferably an actuation capacitor $C_{act}$ and that the detection element is preferably a detection capacitor $C_{det}$. The capacitive value of the actuation capacitor $C_{act}$ and detection capacitor $C_{det}$ varies proportionally relative to the oscillation of the moving mass m. These two capacitors may be mounted in parallel and have the same capacitive value. However, it is also possible to envisage devising an actuation capacitor that is larger or smaller than the detection capacitor.

In addition to drive circuit 3, described in detail below, the MEMS gyroscope is thus formed of a resonator 2, which is defined as primary resonator, and of a secondary resonator for measuring the rotational speed $\Omega$ of the gyroscope in one direction or on a determined axis. This secondary resonator may be a MEMS measurement element 4, which is connected to the moving mass m. This secondary resonator may be formed of at least one resistor, whose resistive value varies as a function of the oscillating motion of mass m. This resistor may be considered to be a strain gauge. The frequency of variation of the resistive value of the resistor is similar to the frequency of variation of the capacitive value of the detection capacitor $C_{det}$.

The resistor is polarized by a current source or a voltage source to supply at one end thereof a measurement signal $S_m$. This measurement signal $S_m$ depends on a signal defined as a carrier signal of the oscillation of mass m detected by detection capacitor $C_{det}$, and on a signal relating to the angular speed $\Omega$ to be measured. The carrier signal is phase shifted by $\pi/2$ from the angular speed signal. Measurement signal $S_m$ is supplied to an integration unit 5, which is controlled by a clocking signal $S_{CLK}$ originating directly from the drive circuit. An integration signal $S_I$ at the output of integration unit 5, can be digitally converted by an analogue-digital converter 6, so as to supply a digital data signal $S_D$ for a processing unit (not shown). This data signal represents the rotational speed data, which has been demodulated from measurement signal $S_m$ by integration unit 5.

Clocking signal $S_{CLK}$ is supplied from drive circuit 3 from a loop for the control of the oscillation amplitude of mass m. Clocking signal $S_{CLK}$ has an equivalent frequency to the carrier signal frequency, but phase shifted by $\pi/2$ as explained hereafter. The carrier signal is, however, in phase with a detection current $I_{det}$ originating from detection capacitor $C_{det}$ of drive circuit 3. This clocking signal is formed of regularly spaced rectangular pulses. This makes it possible to demodulate the angular speed signal contained in measurement signal $S_m$ in integration unit 5 with good synchronisation.

It is to be noted that the detection current $I_{det}$ originating from detection capacitor $C_{det}$ is proportional to the speed of the seismic mass. This detection current is a frequency sinusoidal signal corresponding to the oscillation frequency of the mass set in motion. This detection current $I_{det}$, which originates from the fixed electrode of detection capacitor $C_{det}$, is defined by the formula $I=dQ/dt=d(C\cdot V)/dt=C\cdot dV/dt+V\cdot dC/dt=V\cdot dC/dt$ given that, in this case, $C\cdot dV/dt$ becomes close to 0. Thus, $V\cdot dC/dt$ represents a mathematical derivative signal der, since the capacitive value of capacitor $C_{det}$ varies like the distance x between the electrodes with the motion of seismic mass m. The distance at rest between the electrodes is x0 et x=x0+$\Delta$x where $\Delta$x is very small relative to x0, and this clearly represents the image of the derivative and thus the linear speed. This derivative signal is phase shifted by $\pi/2$ relative to the carrier signal and may serve to generate the clocking signal $S_{CLK}$ as explained hereafter. For example, a comparator may be used in the control loop to directly compare the derivative signal to a reference voltage in order to obtain clocking signal $S_{CLK}$.

Figure 2:
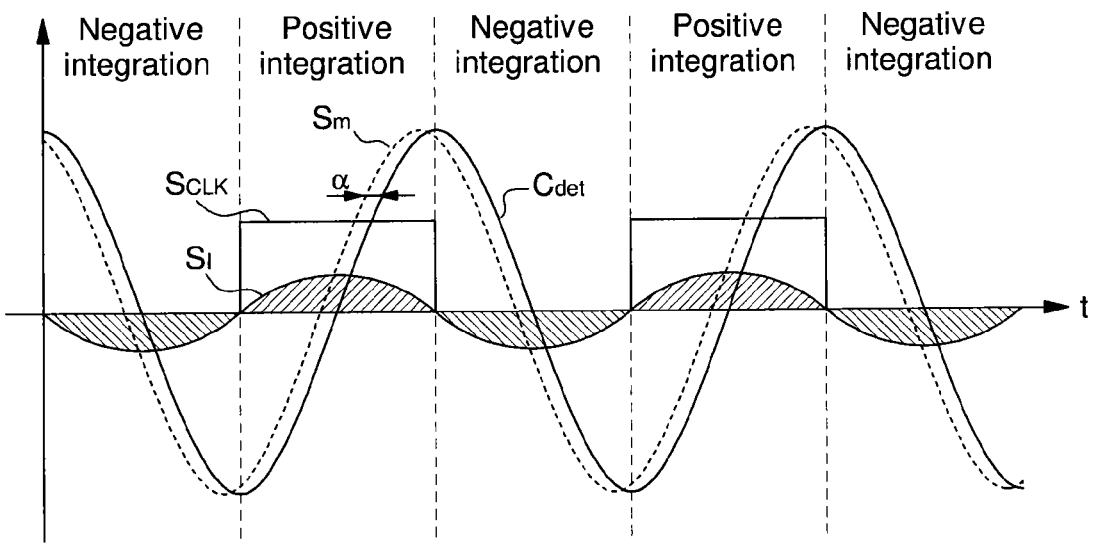
FIG. 2 shows a graph of signals relating to the rotational speed measurement and to integration of the measurement signal to determine rotational speed according to the invention.

FIG. 2 shows various signals for the measurement of rotational speed $\Omega$. The carrier signal $C_{det}$ originating from the maintained oscillation of mass m of the primary resonator, is a signal phase shifted by $\pi/2$ relative to the angular speed signal from the secondary resonator. The carrier signal $C_{det}$, which is normally the detection current signal $I_{det}$, is a sinusoidal signal, whereas the angular speed signal is a cosine signal, i.e. a sinusoidal signal phase shifted by $\pi/2$. This phase shift relates to the indirect Coriolis force measurement subsequent to rotation. The secondary resonator electronic measurement circuit, which is connected to the resistor, must be capable of measuring amplitude, so as to determine rotational speed, which is proportional to the detected amplitude.

As shown in FIG. 2, measurement signal $S_m$, which is supplied by the resistor, is phase shifted by an angle $\alpha$ relative to the carrier signal. This measurement signal includes the addition of the carrier signal and the angular speed signal. Owing to the utilisation of clocking signal $S_{CLK}$, which is phase shifted by $\pi/2$ relative to carrier signal $C_{det}$ in the control loop of the drive circuit, it is easily possible to perform synchronous demodulation in the integration unit. The angular speed related data may be directly obtained by a positive integration and/or a negative integration, in order to supply an integration signal. The integration signal $S_I$ represents the angular speed signal area during positive integration in a first phase with clocking signal $S_{CLK}$ in a first state, or during negative integration in a second phase with clocking signal $S_{CLK}$ in a second state. The area during positive integration in FIG. 2 is defined as positive, whereas the area during negative integration is defined as negative.

The carrier signal may be directly removed in the integration unit given that, during a first state in a first half-period, or a second state in a second half-period of clocking signal $S_{CLK}$, the area of the negative integration side of the carrier signal is equal to the area of the positive integration side of the carrier signal. As a result, the total carrier signal related area is cancelled out for a positive integration or a negative integration based on the clocking of the integration unit by clocking signal $S_{CLK}$. Only the positive area and/or negative area relating to the angular speed signal in the integration signal can be sampled in an analogue-digital converter at the end of positive integration or negative integration. It may be provided that the integration area defined as negative is inverted to supply an integration signal $S_I$ at the end of one complete period of clocking signal $S_{CLK}$, which includes the addition of the two areas representing the measured angular speed. Thus, the integration signal $S_I$ with the two integration area values can be converted in the analogue-digital converter for processing in a processing unit, in order to determine angular speed.

According to the signals shown in FIG. 2, a positive area is obtained during positive integration when clocking signal $S_{ILK}$ is in a first state, for example, at the high state, namely the "1" state, whereas a negative area is obtained during negative integration when clocking signal $S_{CLK}$ is in a second state, for example at the low state, namely the "0" state. However, it is also possible to have positive integration with the clocking signal at the "0" state, and negative integration with the clocking signal at the "1" state.

Figure 3:
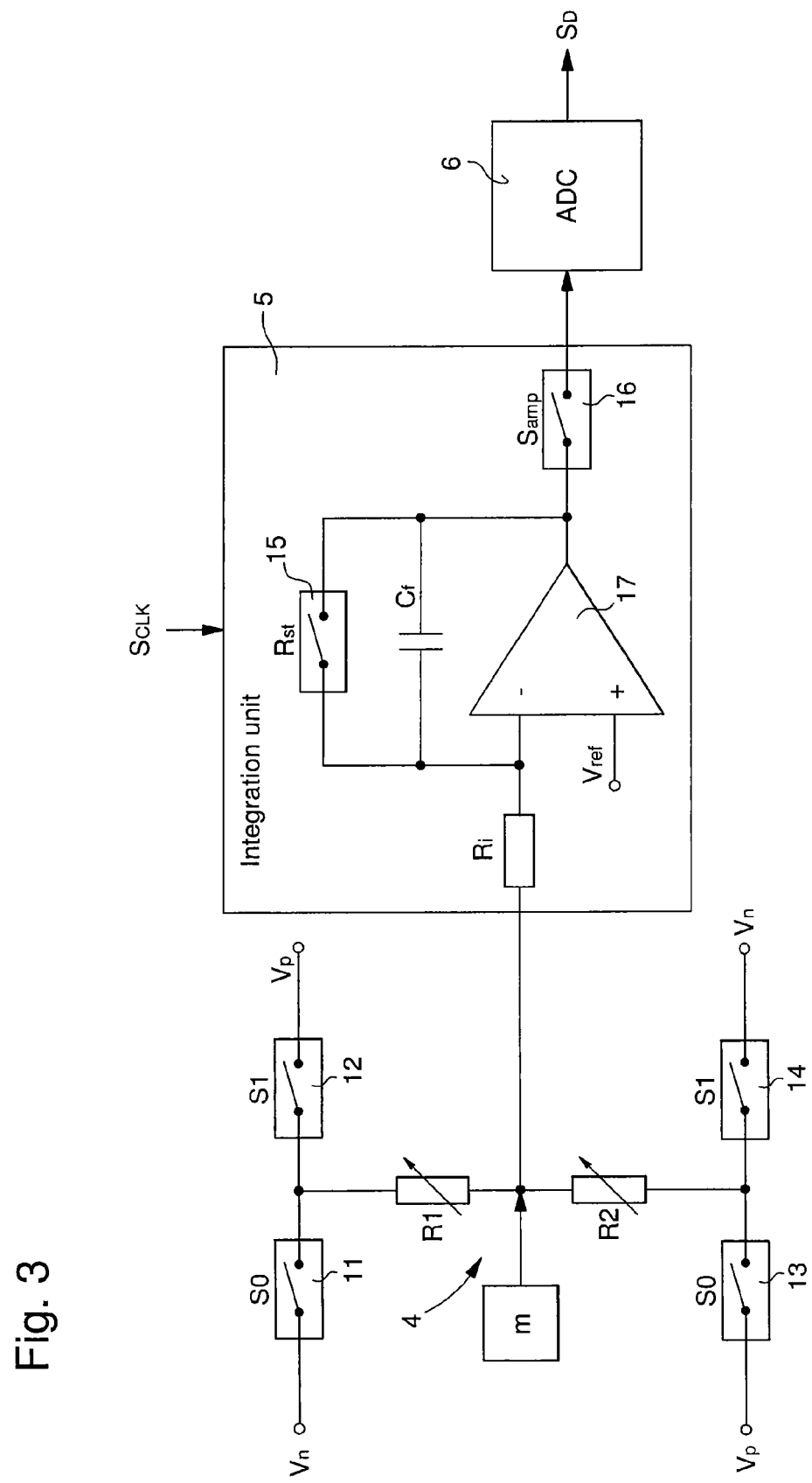
FIG. 3 shows a first embodiment of the components of the electronic circuit for measuring rotational speed according to the invention.

To explain how the angular speed measurement operates, FIG. 3 shows a first embodiment of the components of the electronic circuit for measuring rotational or angular speed. It is noted in this first embodiment, that the MEMS measurement element 4 is formed of a resistive divider R1, R2 or resistive bridge, whose connection node is mechanically connected to mass m but electrically insulated therefrom. A first free end of first resistor R1 and a second free end of second resistor R2 are mechanically connected to a fixed structure of the gyroscope. Thus, the oscillation of the mass generates a variation in the resistive value of the two resistors R1 and R2 of the resistive bridge. The variation signal of first resistor R1 is phase shifted by $\pi$ relative to the variation signal of second resistor R2, i.e. one resistor is pulled when the other is compressed, and vice versa. The two resistors R1, R2 may be strain gauges in the form of metallic wires of nanometric dimensions. These two resistors may have the same resistive value at rest.

Resistive bridge R1, R2 is connected to at least one voltage source (not shown) via a set of switches 11, 12, 13, 14. This set of switches may also form part of integration unit 5. The voltage source supplies a high voltage Vp and a low voltage Vn. High voltage Vp and low voltage Vn are preferably higher than 0V, with high voltage Vp higher than a reference voltage Vref and low voltage Vn lower than reference voltage Vref. High voltage Vp may be equal to Vref+β·Vref, whereas low voltage Vn may be equal to Vref−β·Vref. The voltage source therefore supplies a voltage equal to 2·β·Vref so that a low current, which may be around 100 μA or less, flows through the resistors.

The first free end of first resistor R1 is connected to low voltage Vn via a first switch 11 controlled by control signal S0. This first end of first resistor R1 is alternately connected to high voltage Vp via a second switch 12 controlled by control signal S1, which is the inverse of signal S0 in the integration phases. The second free end of second resistor R2 is connected to high voltage Vp via a third switch 13 controlled by signal S0. The second free end of second resistor R2 is also alternately connected to low voltage Vn via a fourth switch 14 controlled by signal S1.

To perform a first integration, for example an integration defined as positive, the second and fourth switches 12, 14 are controlled by first control signal S1 to be closed, particularly with signal S1 at the "1" state. Conversely, the first and third switches 11, 13 are controlled by the second control signal S0 to be opened, particularly with signal S0 at the "0" state. To perform a second integration, for example an integration defined as negative, the first and third switches 11, 13 are controlled by second control signal S0 to be closed, particularly with signal S0 at the "1" state. Conversely, the second and fourth switches 12, 14 are controlled by first control signal S1 to be opened, particularly with signal S1 at the "0" signal.

These control signals S1 and S0 are directly determined by clocking signal $S_{CLK}$ supplied to integration unit 5 and via a logic unit (not shown). The duration of the opening or closing of switches 11, 12, 13, 14 corresponds to the duration of the first state or of the second state of clocking signal $S_{CLK}$, i.e. when the clocking signal is at a high state or a low state.

Measurement signal $S_m$ is supplied from the node connecting resistors R1 and R2. This measurement signal $S_m$ is normally a sinusoidal signal. However, the polarisation of the resistors changes after each integration phase relating to each state of clocking signal $S_{CLK}$. Consequently, the polarity of measurement signal $S_m$ also changes at each half-period so that, after integration, two successive phases are obtained with two integration areas of the same polarity to be added together.

Measurement signal Sm is thus supplied to integration unit 5, which first of all includes a low value internal resistor $R_i$. This internal resistor is disposed between the node of resistive bridge R1, R2 and a first input of an amplifier 17. A reference voltage Vref is supplied to a second input of amplifier 17. Preferably, the first amplifier input is a negative input, whereas the second amplifier input is a positive input. An integration capacitor Cf is disposed between the first input, which is the negative input of amplifier 17 and the amplifier output. A fifth switch 15 is connected in parallel to integration capacitor $C_f$. This fifth switch 15 is a discharge switch controlled by a control signal Rst to be closed when capacitor $C_f$ is reset to zero for another integration.

When the fifth switch 15 is open, the integration capacitor integrates measurement signal $S_m$, to demodulate the angular speed signal. Integration signal $S_I$ supplied at the amplifier output and relating to at least one positive or negative area of an integration phase, contains angular speed data. At the end of at least one integration phase and preferably after two integration phases over one complete period of clocking signal $S_{CLK}$, a sixth switch 16, as sampling switch, may be closed by a control signal Samp, which is a sampling control signal. Thus, integration signal $S_I$ is sampled in an analogue-digital converter 6 so as to transmit a digital data signal $S_D$ to a processing unit (not shown). The sampling of the integration signal occurs prior to the discharge of the integration capacitor.

Figure 4:
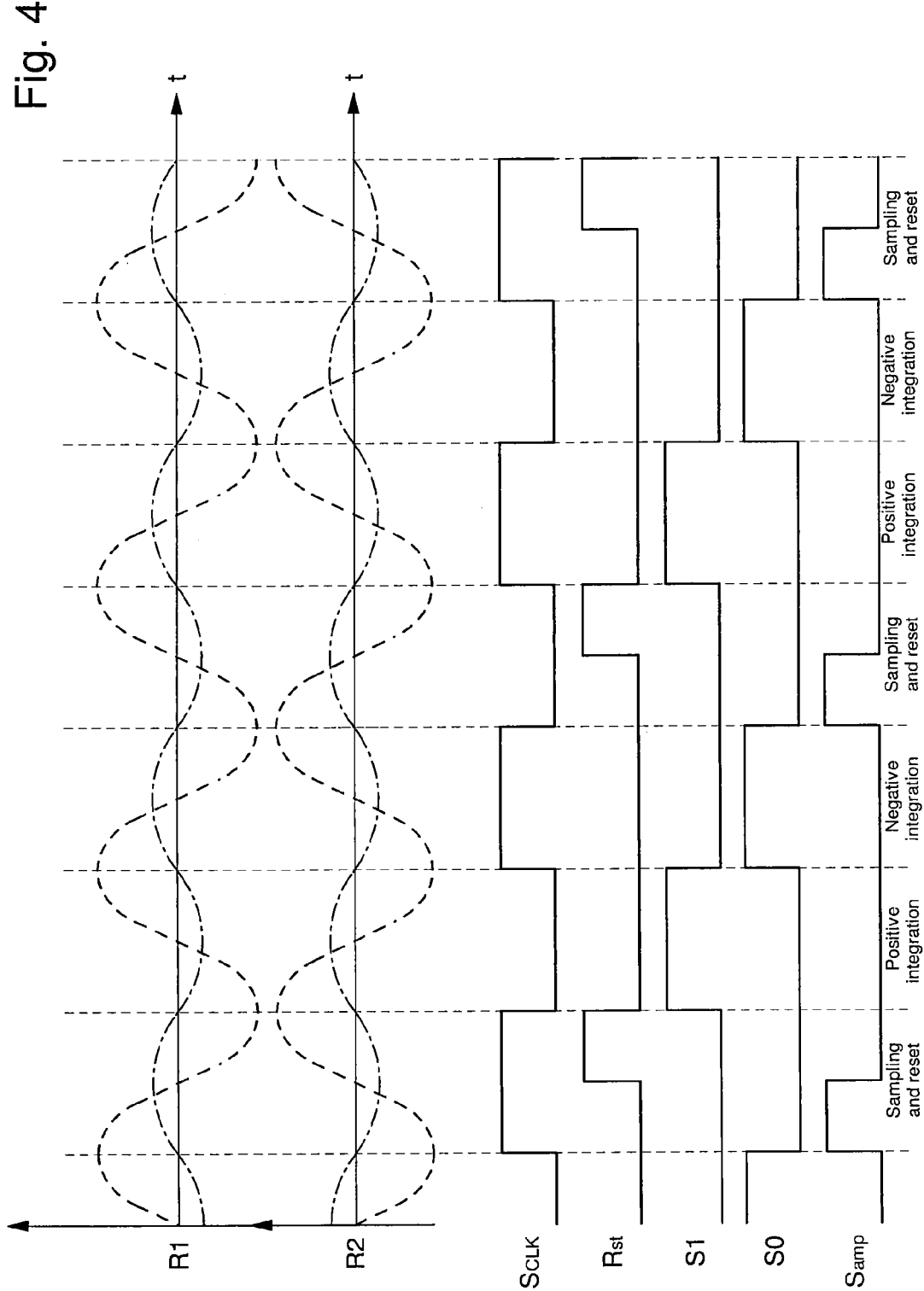
FIG. 4 shows graphs of various signals in the part of the electronic circuit for measuring rotational speed of the first embodiment of FIG. 3 according to the invention.

FIG. 4 clearly shows graphs relating to the control signals for operating the integration unit, so as to integrate the measurement signal, particularly with two successive integration phases controlled by the clocking signal $S_{CLK}$. It shows the variation in resistive value of resistors R1, R2, which depends on the carrier signal, i.e. on the oscillation of the moving mass. The variation signal of first resistor R1 is a sinusoidal signal, and the variation signal of second resistor R2 is also a sinusoidal signal but phase shifted by π relative to the variation signal of first resistor R1. The same graphs for resistors R1 and R2 also show the lower amplitude angular speed signal which is phase shifted by π/2 for each variation in resistive value R1 and R2.

The clocking signal $S_{CLK}$ is formed of rectangular pulses at an equivalent frequency to the frequency of variation in resistive value and to the angular speed signal shown in the first graph for resistor R1. Each integration phase has a duration corresponding to a half-period of the clocking signal. However, after successive first and second integration phases, for example after a positive integration phase and a negative integration phase, a transfer must be made from integration signal $S_I$ to the analogue-digital converter. To achieve this, the sixth switch must be closed by control signal Samp at the "1" state for example. This control signal Samp then changes to the "0" state, for example to open the sixth switch. After this operation, the integration capacitor must be reset to zero by controlling the closing of the fifth switch via control signal Rst at the "1" state for example. Preferably, the two successive control signals Samp and Rst follow each other in the same half-period of clocking signal $S_{CLK}$ after two integration phases. The duration of the "1" state of signals Samp and Rst may be defined as equal to a quarter of the period of clocking signal $S_{CLK}$.

After the operation of sampling and resetting the integration capacitor, the logic circuit of the integration unit controls a first positive integration phase by closing switches 12 and 14 via control signal S1 at the "1" state for example. Control signal S0 of switches 11 and 13 is, however, at the "0" state. Following this first phase, a second negative integration phase is controlled by closing switches 11 and 13 via control signal S0 at the "1" state, whereas switches 12 and 14 are opened by control signal S1 at the "0" state. The two integration phases are clocked and synchronised by clocking signal $S_{CLK}$.

It is clear that several successive positive and negative integration phases may be performed, provided that the integration capacitor is capable of accumulating sufficient electrical charges. Generally, it is preferable to perform only a first positive integration phase followed by a second negative integration phase. It is also possible to envisage first performing a negative integration phase and then performing a second positive integration phase.

By way of variant of the first embodiment, it is possible to envisage having only two switches 12 and 14 for connecting the two resistors R1 and R2 to voltage source Vp, Vn to perform only a first integration phase, which may be a positive integration phase. Switches 12 and 14 are closed by first control signal S1 with clocking signal $S_{CLK}$ in a first state, which makes it possible for the angular speed signal to be demodulated by integration during this half-period of the clocking signal. When clocking signal $S_{CLK}$ is in a second state different from the first state, switches 12 and 14 are opened to sample the integration signal and then reset the integration capacitor $C_f$.

It is also possible to envisage continuously connecting the first end of first resistor R1 to the high voltage terminal Vp of the voltage source and the second end of the second resistor R2 to the low voltage terminal Vn. However, a first switch is arranged between the node connecting the resistors, which supplies measurement signal Sm, and the first input of amplifier 17, which is the negative input. There may also be an internal resistor between the first switch and the first amplifier input. In that case, the first switch is controlled by first control signal S1. In an integration phase, the first switch is controlled to be closed, whereas the integration switch and the sampling switch are opened. At the end of a half-period of clocking signal $S_{CLK}$ during which the measurement signal is integrated, the integration signal is sampled and then the integration capacitor is discharged in the half-period following the integration half-period.

Figure 5:
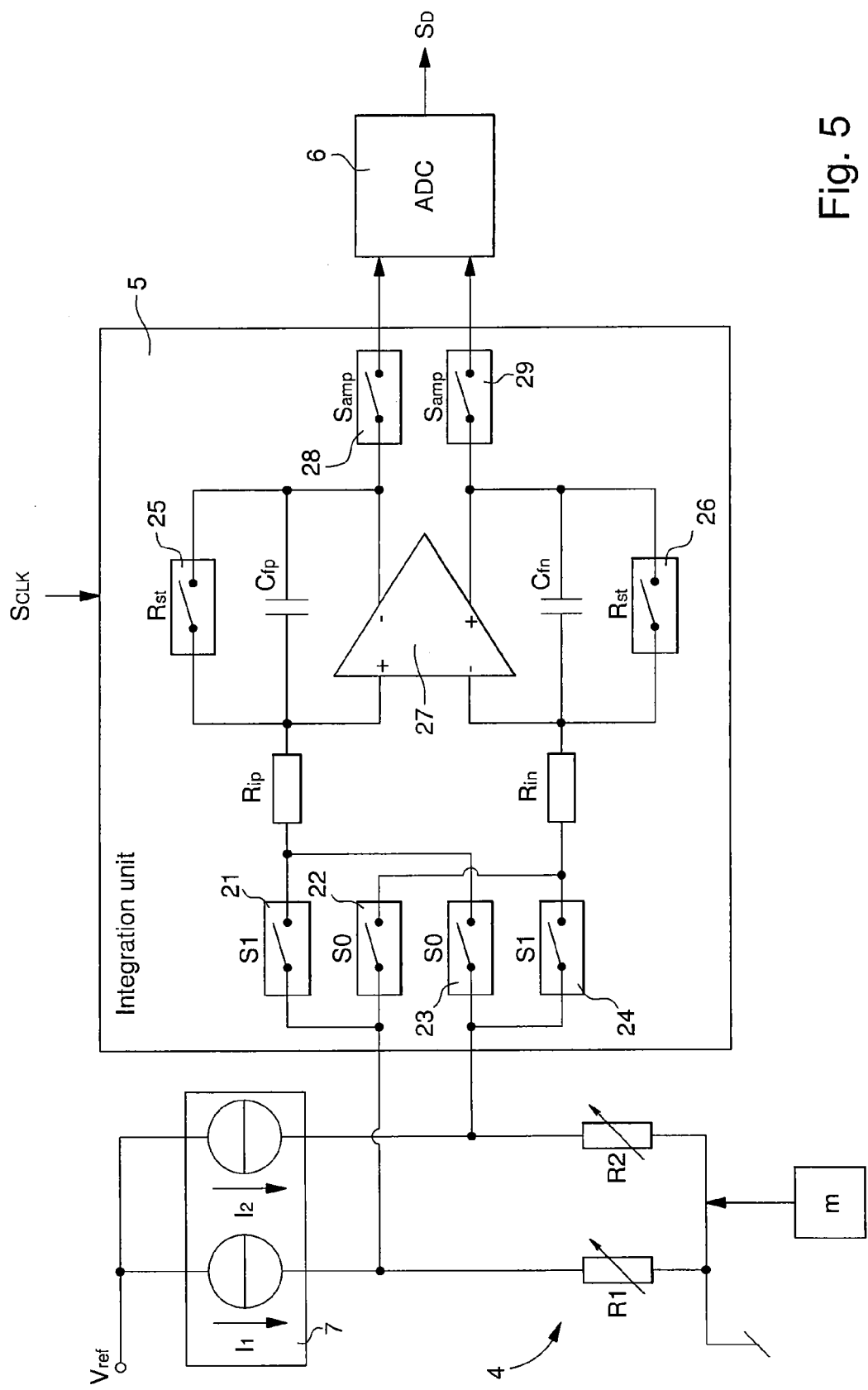
FIG. 5 shows a second embodiment of the components of the electronic circuit for measuring rotational speed according to the invention.

FIG. 5 shows a second embodiment of the components of the electronic circuit for measuring rotational speed. In this second embodiment, the MEMS measurement element 4 is also formed of two resistors R1, R2. The node connecting the two resistors is mechanically connected to mass m, but this time the connection node is electrically connected to the earth terminal like the moving mass. A first free end of first resistor R1 and a second free end of second resistor R2 are mechanically connected to a fixed structure of the gyroscope. Thus, the oscillation of the mass generates a variation in the resistive value of the two resistors R1 and R2. The variation signal of first resistor R1 is preferably phase shifted by π relative to the variation signal of second resistor R2.

In this second embodiment, the two resistors R1 and R2 are polarised by at least one current source unit 7. Preferably, a first current source supplies a first determined current I1 to first resistor R1 through the first free end thereof, while a second current source supplies a second determined current I2 to second resistor R2 through the second free end thereof. The two currents I1 and I2 are preferably of equal value. The first and second current sources 7 are connected to a reference voltage terminal Vref.

The first free end of first resistor R1 supplies a first measurement signal $S_{m1}$ to integration unit 5, while the second free end of second resistor R2 supplies a second measurement signal $S_{m2}$, which is phase shifted by π relative to the first measurement signal $S_{m1}$. The first and second measurement signals $S_{m1}$ and $S_{m2}$ are first connected to a set of switches 21, 22, 23, 24 of integration unit 5. The first measurement signal $S_{m1}$ is supplied to a first switch 21 and to a second switch 22. The second measurement signal $S_{m2}$ is supplied to a third switch 23 and to a fourth switch 24. The output of the first and third switches 21 and 23 is connected to a first internal resistor $R_{ip}$, while the output of the second and fourth switches 22 and 24 is connected to a second internal resistor $R_{in}$. The first and fourth switches 21 and 24 are controlled by a control signal S1 for an integration phase defined as positive, while the second and third switches 22 and 23 are controlled by a control signal S0 for an integration phase defined as negative.

When control signal S1 is at the "1" state for closing the first and fourth switches 21, 24, the first measurement signal $S_{m1}$ is connected to the first internal resistor $R_{ip}$, and the second measurement signal $S_{m2}$ is connected to the second internal resistor $R_{in}$. The control signal S0 is at the "0" state in this positive integration phase. When the control signal S0 is at the "1" state for closing the second and third switches 22, 23, the first measurement signal $S_{m1}$ is connected to second internal resistor $R_{in}$, and the second measurement signal $S_{m2}$ is connected to the first internal resistor $R_{ip}$. Control signal S1 is at the "0" state in this negative integration phase.

Integration unit 5 includes a differential amplifier 27. The first internal resistor $R_{ip}$ is connected to a first input of differential amplifier 27, while the second internal resistor $R_{in}$ is connected to a second input of differential amplifier 27. Preferably, the first input is a positive input, whereas the second input is a negative input.

A first integration capacitor $C_{fp}$ is disposed between the first input, which is the positive input of amplifier 27 and a first negative output of differential amplifier 27. A fifth switch 25 is connected in parallel to the first integration capacitor $C_{fp}$. This fifth switch 25 is controlled by a control signal Rst so as to close said fifth switch 25 when first integration capacitor $C_{fp}$ is reset to zero for another integration. A second integration capacitor $C_{fn}$ is disposed between the second input, which is the negative input of amplifier 27 and a second positive output of differential amplifier 27. A sixth switch 26 is connected in parallel to the second integration capacitor $C_{fn}$. This sixth switch 26 is controlled by a control signal Rst so as to close said sixth switch 26 when second integration capacitor $C_{fn}$ is reset to zero for another integration.

A first integration signal $S_{I1}$ is supplied to the first negative output of differential amplifier 27 and relates to at least one positive or negative area of an integration phase. This first integration signal $S_{I1}$ contains angular speed data. At the end of at least one integration phase and preferably at the end of two integration phases in one complete period of clocking signal $S_{CLK}$, a seventh switch 28 can be closed by a control signal Samp. Thus, the first integration signal $S_{I1}$ is sampled in an analogue-digital converter 6. A second integration signal $S_{I2}$ is supplied to the second positive output of differential amplifier 27. At the end of the desired integration phases, an eighth switch 29 can be closed by control signal Samp. The second integration signal $S_{I2}$ is also sampled at the same time in analogue-digital converter 6. Based on the two sampled signals, the analogue-digital converter transmits a digital data signal $S_D$ to a processing unit (not shown).

The switching of the various switches of this second embodiment by signals S0, S1, Rst and Samp may be similar to the switching of the switches of the first embodiment. In light of this, the description of the integration, sampling and resetting phases of the integration capacitors will not be repeated. The switches of the two embodiments may be made with MOS transistors and preferably with NMOS transistors, whose gate is controlled by any control signal.

It is to be noted that, for this second embodiment with a polarization current source unit for the measurement resistors, polarization currents I1 and I2 may be trimmed to also ensure a gain during this adaptation operation. It is possible for internal resistors $R_i$, $R_{ip}$, $R_{in}$ not to be mounted in the first and second embodiments.

According to a variant of the second embodiment, the set of switches may be formed only of first switch 21 and fourth switch 24 for a single integration phase when first control signal S1 is for example at the "1" state. During the integration phase, the integration switches and the sampling switches are open. At the end of the half-period of clocking signal $S_{CLK}$ during which the measurement signal is integrated, the integration signals are sampled and the integration capacitors are subsequently discharged in the half-period following the integration half-period.

Figure 6:
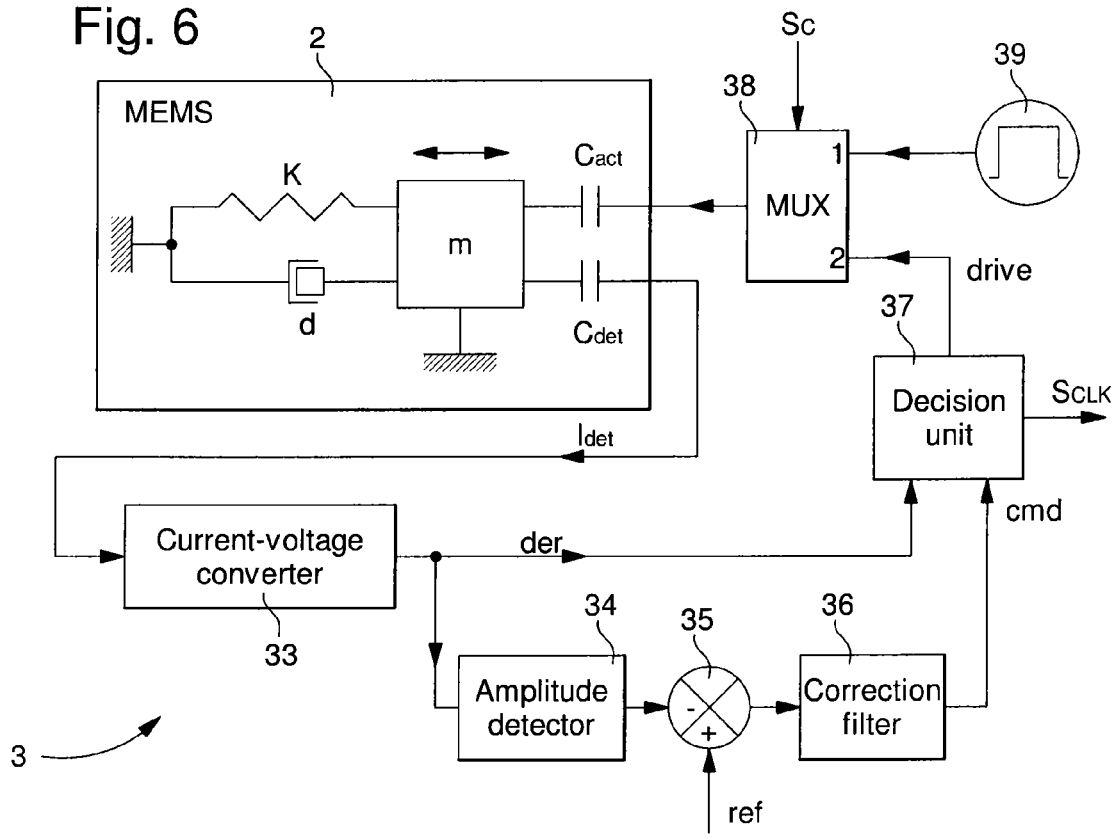
FIG. 6 shows a simplified view of the electronic components of the drive circuit connected to the mass of the MEMS resonator according to the invention.

As also shown in FIG. 6 describing drive circuit 3 of the electronic circuit for measuring rotational speed, a MEMS resonator 2 is used. This drive circuit 3 forms part of a MEMS gyroscope with a high quality factor for measuring angular rotational speed such as that of a disc. The rotation of the resonator can inject vibrational energy into moving mass m. However, since the oscillating system of the MEMS resonator has a natural resonant frequency, and is very selective, the energy supplied outside this frequency band is greatly attenuated. Consequently, the oscillation induced in the mass of the MEMS resonator is very low. The total mass of the gyroscope concerned is assumed to rotate around 2000 degrees per second, i.e. 5 revolutions per second. This corresponds to a frequency of 5 Hz, whereas the MEMS resonator concerned has a bandwidth of around 20 kHz. Since the frequencies involved are significantly far apart, drive circuit 3 actuates the primary resonator.

This resonator 2 may thus include a seismic mass m, which is connected to a spring k, to a damping element d in parallel with the spring, to a detection capacitor $C_{det}$ and to an actuation capacitor $C_{act}$. Applying a voltage across actuation capacitor $C_{act}$ generates an electrostatic attraction force to supply electromechanical power to the seismic assembly formed by mass m with spring k and damping element d. Thus, it is possible to set said mass m in motion by a succession of voltage pulses supplied to the actuation capacitor.

The capacitive value of actuation capacitor $C_{act}$ or detection capacitor $C_{det}$ provides an image of the position of seismic mass m and performs feedback control in drive circuit 3 via detection capacitor $C_{det}$. The primary speed or the force in one direction is thus measured by detection capacitor $C_{det}$. However, the mass is set in motion via actuation capacitor $C_{act}$.

Drive circuit 3 makes it possible to maintain a defined amplitude of oscillation of seismic mass m. The oscillation frequency of mass m is dependent on the factor k of the spring, one end of which is connected to a fixed structure of the gyroscope. Seismic mass m is preferably connected to the earth terminal like the fixed structure. This ensures the proper uncoupling of the two capacitors used for actuating the oscillation of mass m retained by spring k and for detecting the motion of the mass. Preferably, the derivative of the motion of seismic mass m is read.

Drive circuit 3 includes a conversion means 33 connected to a fixed electrode of detection capacitor $C_{det}$. The other electrode of the capacitor is connected to the moving mass, which may be connected to the earth terminal. The distance between the detection capacitor electrodes varies with the motion of the mass. The conversion means makes it possible to perform an electronic analogue reading of the motion of mass m. A variation in the distance I between the electrode fixed to the mass and the fixed position electrode enables the speed of motion of the mass to be measured. The capacitive value of the detection capacitor is given by $C_{det} = \epsilon \cdot S/I$, where the distance I is variable with time, while the surface S of the electrodes facing each other remains constant.

Conversion means 33 is preferably a current-voltage converter 33, which outputs a signal der derivative of the motion of the mass on the basis of a detection current $I_{det}$ from the detection capacitor $C_{det}$. This derivative signal der is generally a sinusoidal voltage signal, whose frequency corresponds to the oscillation frequency of the moving mass. This derivative signal der outputted by converter 33 is supplied in a first branch to a decision unit 37.

The amplitude of derivative signal der must normally be compared to a determined reference or set point amplitude ref. This comparison is performed by a comparison means in decision unit 37 or by a comparison means which is arranged in a second branch between the output of converter 33 and decision unit 37. According to the amplitude level of derivative signal der relative to a reference or set point amplitude ref, decision unit 37 is able to supply an actuation signal drive to a fixed electrode of actuation capacitor $C_{act}$. This actuation signal drive is adapted to maintain the oscillation of the seismic mass at the desired amplitude.

Generally, decision unit 37 acts as a logic unit with the supply of pulsed actuation signals drive for mass m as digital signals. The fixed electrode of the actuation capacitor may receive positive voltage pulses for actuation in accordance with this embodiment, but negative voltage pulses may also be used for actuation. These pulsed signals are defined between a low voltage value, for example 0V, from a supply voltage source (not shown), and a high voltage value, for example the voltage supplied directly by the voltage supply source, which may have a value of between 1.65 V and 3.3 V.

Preferably, drive circuit 3 includes a particular comparison means outside decision unit 37 for comparing the amplitude of derivative signal der to a reference or set point amplitude ref. To achieve this, the derivative signal der is supplied to the input of an amplitude detector 34. This amplitude detector may be a conventional peak detector for detecting, for example, the highest point of derivative signal der, or a rectifier element followed by a low pass filter. A comparator 35 at the output of amplitude detector 34 compares the amplitude of derivative signal der to set point amplitude ref. The derivative signal amplitude is supplied to the negative input of comparator 35, whereas the set point amplitude ref is supplied to the positive input of comparator 35. If the derivative signal amplitude is lower than the set point amplitude, this means that the mass oscillation amplitude must be increased, whereas in the opposite case, the moving mass oscillation amplitude must be decreased.

The comparison signal at the output of comparator 35 must also pass through a correction filter 36 to deliver an amplitude level control signal cmd to decision unit 37. This control signal cmd is higher than the highest point of derivative signal der if the oscillation amplitude of the moving mass has to be increased rapidly. However, this control signal cmd is lower than the lowest point of derivative signal der if the oscillation amplitude of the moving mass has to be decreased rapidly. The voltage pulses drive supplied by decision unit 37 to actuation capacitor $C_{act}$ are thus dependent on the comparison between the comparison signal cmd supplied in the second branch and the derivation signal der supplied in the first branch.

Drive circuit 3 further includes a start generator 39, which is used in an initial phase of actuating drive circuit 3. Generator 39 delivers a start signal to actuation capacitor $C_{act}$ via a multiplexer 38 controlled by a switching signal Sc. The other input of the multiplexer receives the actuation signal drive from decision unit 37 but in an initial start phase, switching signal Sc allows start generator 39 to be connected to actuation capacitor $C_{act}$.

The frequency of the start signal for start generator 39 for actuating mass m of resonator 2 is not synchronised with the natural spring frequency. This means that the combination of the actuation start signal and the oscillation signal passes through minimum amplitude (zero) and maximum amplitude due to the phase shift of the signals. This is not of great importance in the present case, since a simple RC oscillator may, for example, be used in generator 39 for generating the actuation start signal. However, another type of oscillator could also be used without feedback on the oscillation amplitude.

After a time determined by a counter (not shown), multiplexer 38 is controlled by switching signal Sc to connect decision unit 37 to actuation capacitor $C_{act}$ to close the oscillation amplitude feedback loop on the basis of a supplied reference value ref. The derivative signal der must have a sufficient level for the signal to be able to be used in the feedback loop, which is why it is necessary to require, at the start, an actuation start signal by start generator 39.

Decision unit 37 also supplies clocking signal $S_{CLK}$ for the angular speed measurement. As previously indicated, this clocking signal is supplied after a sinusoidal signal, phase shifted by $\pi/2$ from the carrier signal represented by detection current Idet, has been compared to a reference voltage Vref.

Figure 7:
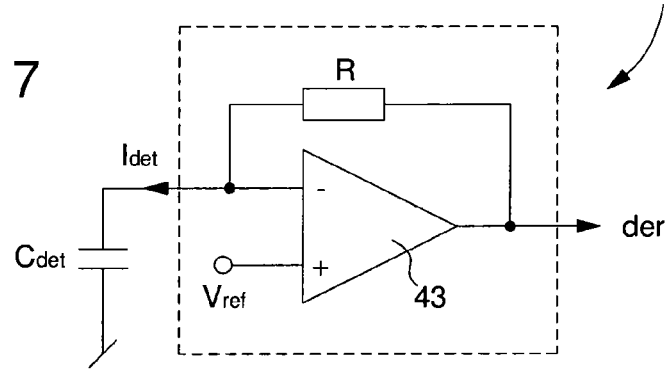
FIG. 7 shows an embodiment of a current-voltage converter of the drive circuit for detecting motion of the resonator mass according to the invention.

FIG. 7 shows an embodiment of the current-voltage converter 33 used for detecting motion of the oscillating mass and for supplying the motion derivative signal der. One of the electrodes of detection capacitor $C_{det}$, which is the fixed electrode, is connected to a negative input of an amplifier 43, for example an operational amplifier. The other capacitor electrode, which is the moving electrode connected to seismic mass m, is preferably connected to the earth terminal of the supply voltage source. A reference voltage Vref is supplied to a positive input of amplifier 43. A resistor R connects the negative input of amplifier 43 and the amplifier output, which delivers the derivative signal der. Derivative signal der is thus a sinusoidal voltage signal relative to reference voltage Vref, which defines the common mode voltage of derivative signal der. The signal is also sinusoidal because the MEMS resonator has a high quality factor with a highly selective frequency.

Figure 8:
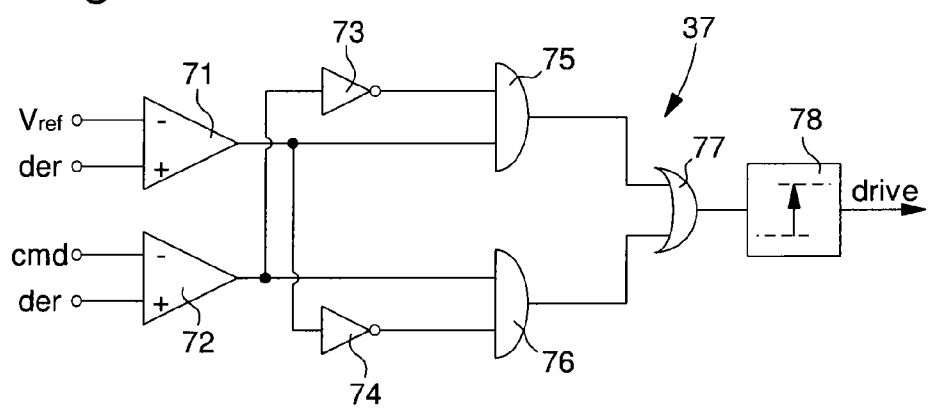
FIG. 8 shows an embodiment of a decision unit of the drive circuit for supplying an actuation signal to an actuation element of the resonator mass according to the invention.

FIG. 8 shows an embodiment of decision unit 37, which represents a logic unit for supplying pulsed signals drive as digital signals. Decision unit 37 first of all includes two amplifiers 71 and 72, which are fast comparators. The output of each comparison amplifier is either at a high level representative of a "1" state, or at a low level representative of a "0" state of a digital signal. The first amplifier 71 receives reference voltage Vref at a negative input and derivative signal der at a positive input. The output of this first differential amplifier 71 directly supplies the clocking signal $S_{CLK}$ for the angular speed measurement. The second amplifier 72 receives amplitude control signal cmd at a negative input and derivative signal der at a positive input. When derivative signal der is higher than reference voltage Vref and control signal cmd, the output of amplifiers 71, 72 is in the "1" state. When derivative signal der is lower than reference voltage Vref and control signal cmd, the output of amplifiers 71, 72 is in the "0" state.

Decision unit 37 further includes a first AND gate 75, which receives the output signal from first amplifier 71 at a first input and the output signal from second amplifier 72 inverted by a first inverter 73 at a second input. Decision unit 37 further includes a second AND gate 76, which receives the output signal from second amplifier 72 at a first input and the output signal from first amplifier 71 inverted by a second inverter 74 at a second input. The output signal from the first AND gate 75 is supplied to a first input of an OR gate 77, whereas the output signal from the second AND gate 76 is supplied to a second input of OR gate 77. The preliminary actuation signal outputted by OR gate 77 may also pass through a voltage booster element 78 to deliver actuation signal drive to the output of decision unit 37, which is a pulsed signal such as a digital signal. The pulses of the actuation signal are arranged according to the level of control signal cmd, and the level of reference voltage Vref in comparison to derivative signal der.

It should be noted that the preliminary actuation signal, which is supplied at the output of OR gate 77 may be immediately used to actuate the actuation capacitor. However, the signal obtained at the output of OR gate 77 must preferably be shifted in level by voltage booster element 78 as a function of the level of the highest supply voltage of the integrated electronic circuit to maximise the energy supplied to the MEMS resonator.

It is also to be noted that the resonator and the electronic drive circuit described above are normally provided for measuring an angular speed of a gyroscope in one direction or on a defined axis. However, it is entirely possible to envisage using the concept of the electronic circuit with one or more masses for an angular speed measurement on one, two or three axes for a MEMS type gyroscope with a high quality factor.

From the description that has just been given, several variants of the electronic circuit for measuring angular speed in a gyroscope with a MEMS resonator and the method of actuating the electronic circuit can be devised by those skilled in the art without departing from the scope of the invention defined by the claims. A single comparator unit may be used for comparing the derivative signal to the reference signal to supply the clocking signal.

What is claimed is:

1. An electronic circuit for measuring rotational speed in a gyroscope with a MEMS resonator, the electronic circuit being connected to at least one resonator of the gyroscope, the resonator including a mass connected to a structure of the gyroscope by a spring and a damping element, an actuation element for setting in motion the mass in one direction based on an actuation signal, supplied by a drive circuit, and a detection element for detecting motion of the mass to adapt at least one level of oscillation amplitude of the mass in motion in a control loop of the drive circuit,
    wherein the electronic circuit includes a measurement element in the form of at least one resistor, which is connected to the mass in motion and whose resistive value varies at a frequency identical to an oscillation frequency of the mass in motion, the resistor being polarized to supply at least one measurement signal at one end of the resistor, the measurement signal being formed of a combination of a carrier signal in phase with the oscillation of the mass in motion and of an angular speed signal being phase shifted by $\pi/2$, and
    wherein the electronic circuit includes an integration unit clocked by a clocking signal originating from the control loop of the drive circuit, the clocking signal being phase shifted by $\pi/2$ relative to a detection signal of the detection element in phase with the carrier signal to allow the integration unit to demodulate the angular speed signal from the measurement signal.

2. The electronic circuit according to claim 1, wherein the detection element is a detection capacitor, wherein the drive circuit includes a current-voltage converter, which outputs a mathematical derivative signal of the motion of the mass based on a detection current of the detection capacitor, and wherein the clocking signal is obtained at an output of at least one comparator, which compares the derivative signal to a reference voltage.

3. The electronic circuit according to claim 2, wherein the current-voltage converter includes an amplifier, a negative input of which is connected to a fixed electrode of the detection capacitor, and a positive electrode of which receives the reference voltage, a resistor being placed between the negative input and an output of the amplifier, which supplies the derivative signal in sinusoidal form referenced in relation to the reference voltage with a positive alternation above the reference voltage and a negative alternation below the reference voltage.

4. The electronic circuit according to claim 1, wherein the measurement element includes at least first and second resistors mounted in the form of a resistive bridge, a node connecting the first and second resistors being mechanically connected to the mass in motion, a variation in resistive value of the first resistor being inverse to a variation in resistive value of the second resistor.

5. The electronic circuit according to claim 4, wherein the first and second resistors are polarized by at least one voltage source, and wherein the measurement signal is supplied to the node connecting the first and second resistors.

6. The electronic circuit according to claim 5, wherein the node connecting the first and second resistors, which supplies the measurement signal, is connected to a switch at an input of the integration unit, said switch being controlled by a control signal, which depends on the clocking signal, and wherein the switch is in a closed state in an integration phase in a first state of the clocking signal, and in an open state in a second state of the clocking signal.

7. The electronic circuit according to claim 5, wherein a first free end of the first resistor and a second free end of the second resistor are inversely connected to a high potential terminal and to a low potential terminal of the voltage source via a set of two switches, which are controlled by a first control signal which depends on the clocking signal, said set of two switches being in a closed state in an integration phase in a first state of the clocking signal, and in an open state in a second state of the clocking signal.

8. The electronic circuit according to claim 5, wherein a first free end of the first resistor and a second free end of the second resistor are inversely and alternately connected to a high potential terminal of the voltage source and to a low potential terminal of the voltage source via a set of switches, which are controlled by control signals dependent on the clocking signal.

9. The electronic circuit according to claim 8, wherein the set of switches includes a first switch connecting the first free end of the first resistor to the low potential of the voltage source, a second switch connecting the first free end of the first resistor to the high potential of the voltage source, a third switch connecting the second free end of the second resistor to the high potential of the voltage source and a fourth switch connecting the second free end of the second resistor to the low potential of the voltage source, wherein the second and fourth switches are controlled by a first control signal to be closed in a first integration phase during a first state of the clocking signal with the first and third switches open, and wherein the first and third switches are controlled by a second control signal to be closed in a second integration phase during a second state of the clocking signal with the second and fourth switches open.

10. The electronic circuit according to claim 1, wherein the integration unit includes an amplifier, whose first input receives the measurement signal and whose second input receives a reference voltage, an integration capacitor being disposed between the first input and an output of the amplifier to supply an integration signal in an integration phase in a first state of the clocking signal.

11. The electronic circuit according to claim 10, wherein the first input of the amplifier is a negative input, wherein the second input of the amplifier is a positive input, and wherein a discharge switch is connected in parallel to the integration capacitor to be controlled by a discharge control signal before or after at least one integration phase.

12. The electronic circuit according to claim 11, wherein the electronic circuit includes an analogue-digital converter for sampling the integration signal and supplying a digital data signal, and wherein a sampling switch of the integration unit is disposed between an amplifier output and a converter input, the sampling switch being controlled by a sampling control signal to supply the integration signal to the converter immediately after at least one integration phase and before a discharge control from the integration capacitor.

13. The electronic circuit according to claim 4, wherein the node connecting the first and second resistors is connected to an earth terminal, wherein the first and second resistors are polarized by a current source unit, a first current source being connected to a first end of the first resistor and a second current source being connected to a second end of the second resistor, wherein a first measurement signal is supplied to the first end of the first resistor, and wherein a second measurement signal is supplied to the second end of the second resistor.

14. The electronic circuit according to claim 13, wherein the first end of the first resistor is connected to a first switch at the input of the integration unit, wherein the second end of the second resistor is connected to a second switch at the input of the integration unit, wherein the first and second switches are controlled by a first control signal dependent on the clocking signal, said first and second switches being in a closed state in an integration phase in a first state of the clocking signal, and in an open state in a second state of the clocking signal.

15. The electronic circuit according to claim 13, wherein the first end of the first resistor is connected to a first switch and to a second switch at an input of the integration unit, wherein the second end of the second resistor is connected to a third switch and to a fourth switch at the input of the integration unit, wherein the first and fourth switches are controlled by a first control signal dependent on the clocking signal, wherein the second and third switches are controlled by a second control signal dependent on the clocking signal, wherein the first and fourth switches are closed by the first control signal in a first integration phase, whereas the second and third switches are open, and wherein the second and third switches are closed by the second control signal in a second successive integration phase, whereas the first and fourth switches are open.

16. The electronic circuit according to claim 13, wherein the integration unit includes a differential amplifier, whose first input receives at least the first measurement signal in an integration phase and whose second input receives at least the second measurement signal in the integration phase, wherein a first integration capacitor is disposed between the first input and a first output of the differential amplifier to supply a first integration signal in the integration phase in a first state of the clocking signal, and wherein a second integration capacitor is disposed between the second input and a second output of the differential amplifier to supply a second integration signal.

17. The electronic circuit according to claim 16, wherein the first input of the differential amplifier is a positive input, wherein the second input of the differential amplifier is a negative input, wherein a first discharge switch is connected in parallel to the first integration capacitor to be controlled by a discharge control signal before or after at least one integration phase, and wherein a second discharge switch is connected in parallel to the second integration capacitor to be controlled by the discharge control signal before or after at least one integration phase.

18. The electronic circuit according to claim 17, wherein the electronic circuit includes an analogue-digital converter for sampling the first integration signal and the second integration signal and for supplying a digital data signal, and wherein a first sampling switch of the integration unit is disposed between the first output of the differential amplifier and a first input of the analogue-digital converter, wherein a second sampling switch of the integration unit is disposed between the second output of the differential amplifier and a second input of the analogue-digital converter, and wherein the first and second sampling switches are controlled by a sampling control signal to supply the first and second integration signals to the converter immediately after at least one integration phase and before a control signal for discharging the first and second integration capacitors.

19. A method for actuating the electronic circuit for measuring rotational speed in the gyroscope with the MEMS resonator according to claim 1, wherein the method includes the steps of:
supplying the measurement signal via at least one measurement resistor dependent on the oscillation of the mass in motion to the integration unit in an integration phase dependent on the clocking signal; and
supplying the integration signal relating to the angular speed signal demodulated from the measurement signal at the integration unit output for the duration of a half-period of a first state of the clocking signal.

20. The method for actuating the electronic circuit according to claim 19, wherein the electronic circuit includes at least first and second resistors mounted in the form of a resistive bridge and polarized by at least one voltage source or a current source unit, a node connecting the first and second resistors being mechanically connected to the mass in motion, a variation in resistive value of the first resistor being inverse to a variation in resistive value of the second resistor, wherein the measurement signal is supplied to the integration unit during a first integration phase in a first state of the clocking signal, wherein an inverse measurement signal is supplied to the integration unit during a second integration phase in a second state of the clocking signal.

21. The method for actuating the electronic circuit according to claim 19, wherein, at an end of the integration phase, the integration signal is supplied to an analogue-digital converter, and wherein after the integration signal is supplied to the converter, the integration capacitor is discharged before another integration phase while being clocked by the clocking signal.

22. The method for actuating the electronic circuit according to claim 19, wherein the electronic circuit includes at least first and second resistors mounted in the form of a resistive bridge, whose node connecting the at least first and second resistors is connected to an earth terminal, and wherein a first current source is connected to a first end of the first resistor for supplying a first measurement signal to the integration unit and a second current source is connected to a second end of the second resistor for supplying a second measurement signal to the integration unit, wherein first and second integration signals are outputted by the integration unit based on the first and second measurement signals and during an integration phase in a first state of the clocking signal.

23. The method of actuating the electronic circuit according to claim 22, wherein, at an end of the integration phase, the first and second integration signals are supplied to an analogue-digital converter, and wherein, after the first and second integration signals are supplied to the converter, the integration capacitor is discharged before another integration phase while being clocked by the clocking signal.

24. The method for actuating the electronic circuit according to claim 22, wherein the first measurement signal is supplied to a first input of a differential amplifier of the integration unit in a first integration phase, wherein the second measurement signal is supplied to a second input of the differential amplifier in the first integration phase, wherein the first measurement signal is supplied to the second input of the differential amplifier in a second integration phase, wherein the second measurement signal is supplied to the first input of the differential amplifier in the second integration phase, and wherein the first and second integration signals are outputted by the integration unit at the end of one complete period of the clocking signal.

* * * * *